US005677714A

United States Patent [19]
Klassen et al.

[11] Patent Number: 5,677,714
[45] Date of Patent: Oct. 14, 1997

[54] NEIGHBOR INSENTIVE PIXEL DELETION METHOD FOR PRINTING HIGH RESOLUTION IMAGE

[75] Inventors: R. Victor Klassen, Webster; Stephen C. Morgana, Brockport, both of N.Y.

[73] Assignee: Xerox Corporation, Stamford, Conn.

[21] Appl. No.: 368,132

[22] Filed: Jan. 3, 1995

[51] Int. Cl.[6] .................. B41J 29/38; B41J 2/205
[52] U.S. Cl. .................. 347/9; 347/15; 358/29
[58] Field of Search .................. 347/9, 15, 41, 347/37; 358/296, 445, 451; 395/117, 128

[56] References Cited

U.S. PATENT DOCUMENTS

| | | | |
|---|---|---|---|
| 4,437,122 | 3/1984 | Walsh et al. | 348/625 |
| 4,629,342 | 12/1986 | Futaki | 400/124.07 |
| 4,774,530 | 9/1988 | Hawkins | 347/63 |
| 4,967,203 | 10/1990 | Doan et al. | 347/41 |
| 5,029,108 | 7/1991 | Lung | 395/109 |
| 5,270,728 | 12/1993 | Lund et al. | 347/5 |
| 5,353,387 | 10/1994 | Petschik et al. | 395/109 |
| 5,359,355 | 10/1994 | Nagoshi et al. | 347/9 |
| 5,374,943 | 12/1994 | Lehmann et al. | 347/9 |
| 5,469,198 | 11/1995 | Kadonaga | 347/41 |

Primary Examiner—Benjamin R. Fuller
Assistant Examiner—Craig A. Hallacher
Attorney, Agent, or Firm—Oliff & Berridge

[57] ABSTRACT

To print an image having a 600 dpi resolution along the horizontal axis with an ink jet printer that has a 300 dpi resolution, the method maintains the edges of the pixel image and uses a checkerboard pattern for all interior pixels other than the second pixel and the second last pixel of each pixel row. Therefore, the method is neighbor insensitive by using a checkerboard pattern or mask to determine the state of the interior pixels. After turning OFF the respective pixels, ink drops are fired from the ink jet printer at areas corresponding to the remaining ON pixels. This visibly reproduces the image at the 600 dpi resolution.

22 Claims, 8 Drawing Sheets

NEIGHBOR INSENTIVE PIXEL DELETION METHOD FOR PRINTING HIGH RESOLUTION IMAGE

BACKGROUND OF THE INVENTION

1. Field of the Invention

This invention relates to ink jet printers and more particularly, to a method of altering a high resolution pixel image to produce a pixel image that is capable of being visibly reproduced by an ink jet printer having a lower resolution.

2. Description of Related Art

An ink jet printhead selectively ejects droplets of ink from a plurality of drop ejectors to create a desired image on an image receiving medium, such as paper. The printhead typically comprises an array of drop ejectors that convey ink to the image receiving medium. In a carriage-type ink jet printhead, the printhead moves back and forth relative to the image receiving medium to print the images in swaths.

The ink jet printhead typically comprises a plurality of ink passageways, such as capillary channels. Each channel has a nozzle end and is connected to an ink supply manifold. Ink from the manifold is retained within each channel until, in response to an appropriate signal applied to a resistive heating element in that channel, the ink in a portion of the channel adjacent to the heating element is rapidly heated and vaporized. Rapid vaporization of some of the ink from the channel creates a bubble that causes a quantity of ink (i.e., an ink droplet) to be ejected through the nozzle to the image receiving medium. U.S. Pat. No. 4,774,530 to Hawkins, the disclosure of which is incorporated herein by reference, shows a general configuration of a typical ink jet printer.

Many commercially available ink jet printers have a 300 dots per inch (dpi) resolution along the horizontal axis (also called the raster scan axis). Ink jet printers also typically have a 300 dpi vertical resolution so as to form round individual ink droplets that form the pixel images on the paper. These ink jet printers are therefore designed to print 300 by 300 dpi output images. However, increased resolution is desired to print higher resolution images. For example, it may be desirable to print a 300 by 600 dpi pixel image using a 300 dpi ink jet printhead. The effective resolution of an ink jet printer can be increased along the horizontal axis (or raster scan axis) by energizing or firing the ink jets at a higher rate. This requires redesigning the ink jet firing head and therefore results in a substantially higher cost. It is also possible to increase the effective resolution along the raster scan axis by slowing down the rate at which the printhead moves across the paper. However, this may cause excessive ink to be deposited on the paper due to excessive ink drop overlap.

U.S. Pat. No. 5,270,728 to Lund et al., the disclosure of which is incorporated herein by reference, discloses a method for multiplying the speed resolution of a raster scanning device such as an ink jet printer. A 300×600 dpi pixel image is mapped to a corresponding, non-overlapping physical dot image and the ink jets are fired in response to the dot image to direct ink droplets onto the paper at 600 dpi resolution grid timing to effectively double the horizontal resolution of the pixel image. This is done without increasing the firing rate of the printhead.

U.S. Pat. No. 5,270,728 describes thinning the pixel image before it is printed by selectively turning off pixels within the pixel image by referencing the edges of the pixel image. More specifically, U.S. Pat. No. 5,270,728 describes a method of maintaining selected ones of the pixels in an ON state based on ON pixel adjacency and edge proximity criteria.

FIG. 1 shows a pixel image 200 that is desired to be printed by the ink jet printer. In FIG. 1, each pixel is represented by a corresponding shaded rectangle having a 300 dpi vertical and 600 dpi horizontal resolution. For ease of illustration, each row is consecutively numbered 10, 11, 12, 13, 14, 15, 16 and 17. Each of the columns of the pixel image 200 is labeled with a corresponding letter A, B, C, D, E, F, G and H. The columns are labeled across the raster scanning (or horizontal) direction X. The rows are labeled in the slow scan (or vertical) direction Y. As an example, the pixel in the upper left hand corner of the pixel image 200 is labeled as pixel 10C. Similarly, the pixel in the bottom right hand corner is labeled as pixel 17G.

FIG. 2 shows an altered pixel image 210 according to the method described in U.S. Pat. No. 5,270,728. As can be seen by FIG. 2, selected pixels are turned OFF so that no two adjacent pixels of the original pixel image 200 are maintained ON for a given row. Furthermore, the left hand edge of the original pixel image 200 is always maintained in an ON state. Furthermore, the second to last pixel in each of the respective rows is always maintained ON while turning OFF the last pixel in each row. For example, pixels 10C and 10G are maintained ON while pixel 10H is turned OFF. Further, interior ON pixels are maintained ON based on their proximity to the edges of the image. Thus, the method described in U.S. Pat. No. 5,270,728 is concerned with determining the proximity (or closeness) of a pixel to an edge of a pixel row.

As can be seen by FIG. 2, the method of U.S. Pat. No. 5,270,728 may result in a vertical column of pixels being turned OFF. For example, this can be seen by pixels 12E, 13E, 14E, 15E, 16E and 17E. The OFF pixels in column E can lead to visual problems (such as visual texture) when the altered pixel image 210 is mapped and printed according to the method described by U.S. Pat. No. 5,270,728.

FIG. 3 shows a mapping process described in U.S. Pat. No. 5,270,728 whereby each pixel that was maintained ON during the altering step (i.e., following FIG. 2) is subsequently mapped with an OFF pixel to its immediate right. For example, dot 60 corresponds to ON pixel 10C and OFF pixel 10D. The resulting dot structure represents the 300 dpi resolution of the printhead. Thus, the altered pixel image 210 described in FIG. 2 is mapped so that each ON pixel is mapped to a dot 60 with a corresponding OFF pixel to its immediate right. The dot structure of FIG. 3 is then raster scanned by the ink jet printer to print the pixel image.

U.S. Pat. No. 5,270,728 suffers from several problems that effect the visual quality of the resulting image on the copy sheet. For example, when all the pixels in a respective column are turned OFF such as in column E for rows 12–17, visual texture problems may result on the copy sheet. These problems occur in part because the method described in U.S. Pat. No. 5,270,728 relies on edge proximity criteria to determine how close respective pixels are to an edge. While it may sometimes be desirable to be sensitive to the edge, this results in a complicated method that requires the numerous pixels within each row to be examined before each pixel is appropriately maintained ON or turned OFF.

SUMMARY OF THE INVENTION

To solve these and other problems, this invention provides a method of increasing the effective resolution of a printhead without the need for edge proximity criteria. This invention therefore provides a much simpler method than that described in U.S. Pat. No. 5,270,728 and accordingly results in an easier to implement method.

This invention also provides a method of printing an image having a defined resolution along a given axis using an ink jet printer that has a predetermined resolution less than the defined resolution of the image. The image is received having the defined resolution along the given axis. The second pixel and the second last pixel of each contiguous row of ON pixels are subsequently turned OFF. Interior pixels of the image are altered based on a checkerboard pattern or mask. After the altering step, the remaining pixels of the image are raster scanned with the ink jet printer to visibly reproduce the image at the defined resolution.

Other objects, advantages and salient features of the invention will become apparent from the following detailed description taken in conjunction with the annexed drawings, which disclose preferred embodiments of the invention.

BRIEF DESCRIPTION OF DRAWINGS

The invention will be described with reference to the following drawings in which like reference numerals refer to like elements and wherein.

DETAILED DESCRIPTION OF PREFERRED EMBODIMENTS

Figure 4:
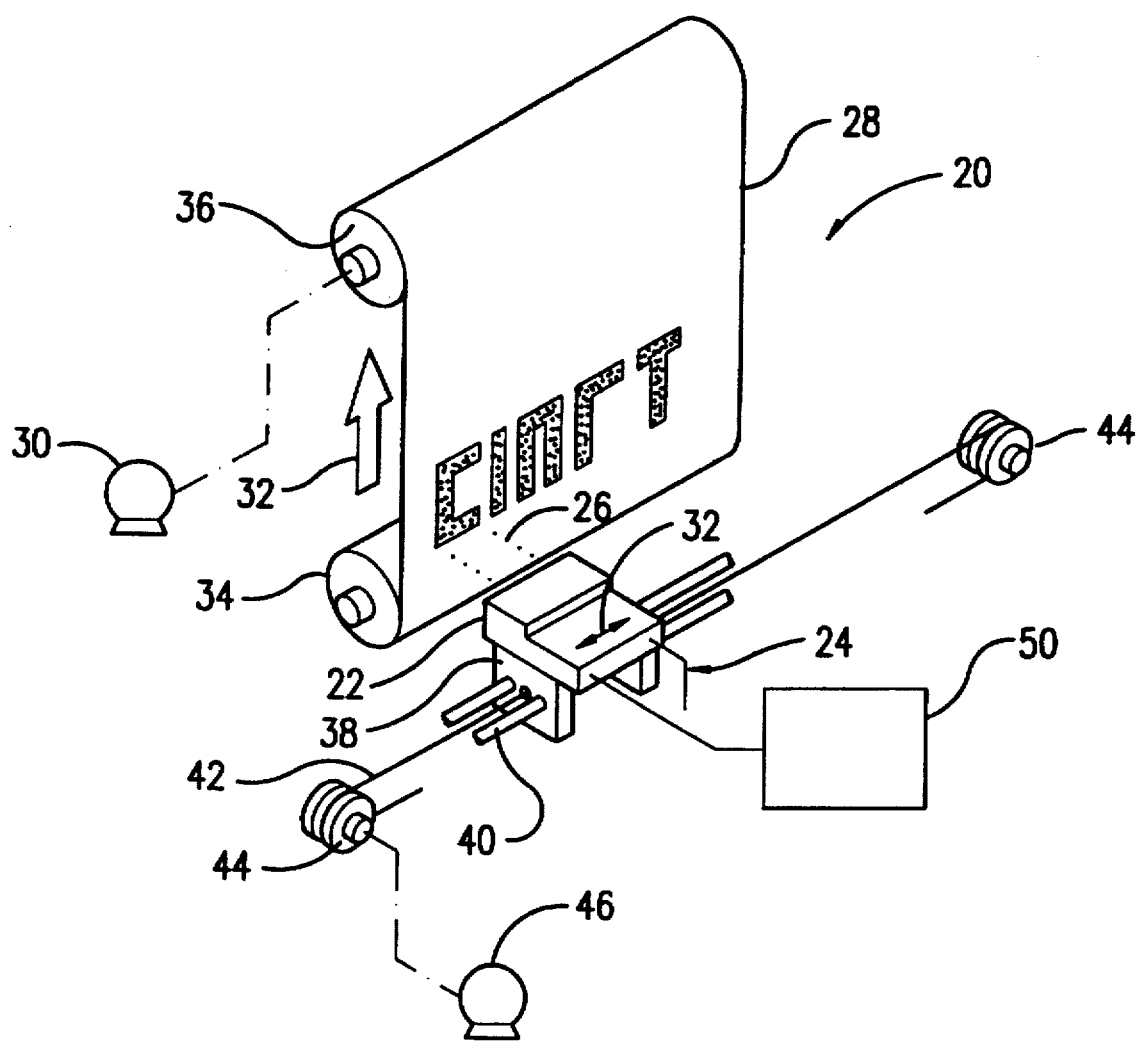
FIG. 4 is a schematic view of an ink jet printing system.

FIG. 4 shows a carriage-type ink jet printing device 20. A linear array of droplet-producing channels is housed in the printhead 22 of a reciprocal carriage assembly 24. Ink droplets 26 are propelled to a receiving medium 28 that is stepped by a motor 30 a preselected distance in the direction of arrow 32 each time the printhead 22 traverses across the receiving medium 28 in the direction indicated by arrow 32. The receiving medium 28, such as paper, can be stored on the supply roll 34 and stacked onto a take-up roll 36 by a stepper motor 30 or other means well known in the art.

The printhead 22 is fixedly mounted on the support base 38, which is adapted for reciprocal movement using any well known means such as the two parallel guide rails 40. The reciprocal movement of the printhead 22 may be achieved by a cable 42 and a pair of rotatable pulleys 44, one of which is powered by a reversible motor 46. The printhead 22 is generally moved across the receiving medium 28 perpendicularly to the direction the receiving medium 28 is moved by the motor 30. Of course, other structures for reciprocating the carriage assembly 24 are also known within the art.

The printhead 22 may also be connected to a controller 50 that will be used with embodiments of the present invention to receive a pixel image at a resolution greater than that of the printhead 22. The controller 50 may include hardware or software to carry out the present invention as will be described below. Further, it is understood that the above description of the ink jet printing device 20 is merely illustrative and is not limiting. That is, other structures are also within the scope of this invention.

Figure 5:
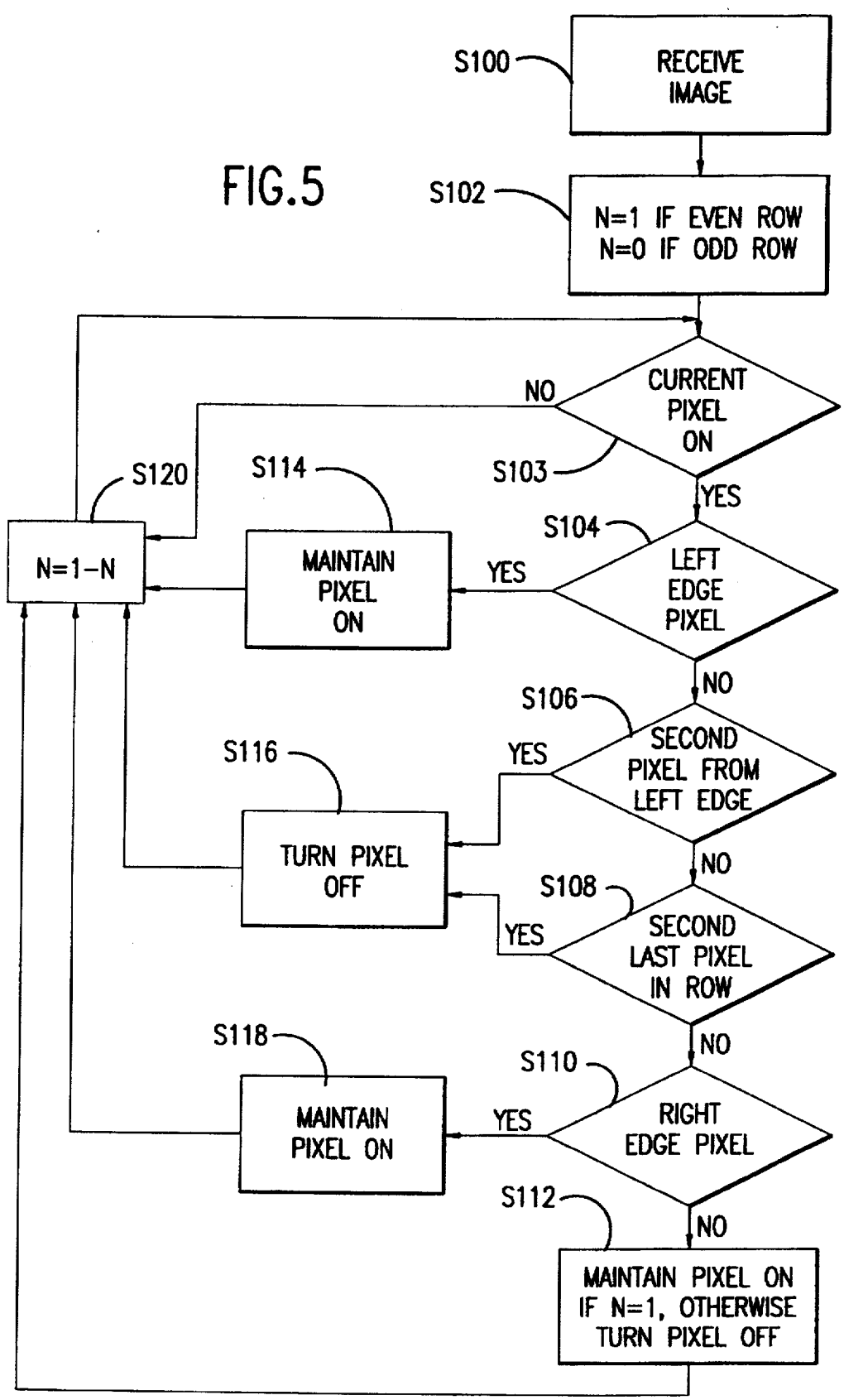
FIG. 5 is a flowchart describing an embodiment of the present invention.
Figure 6:
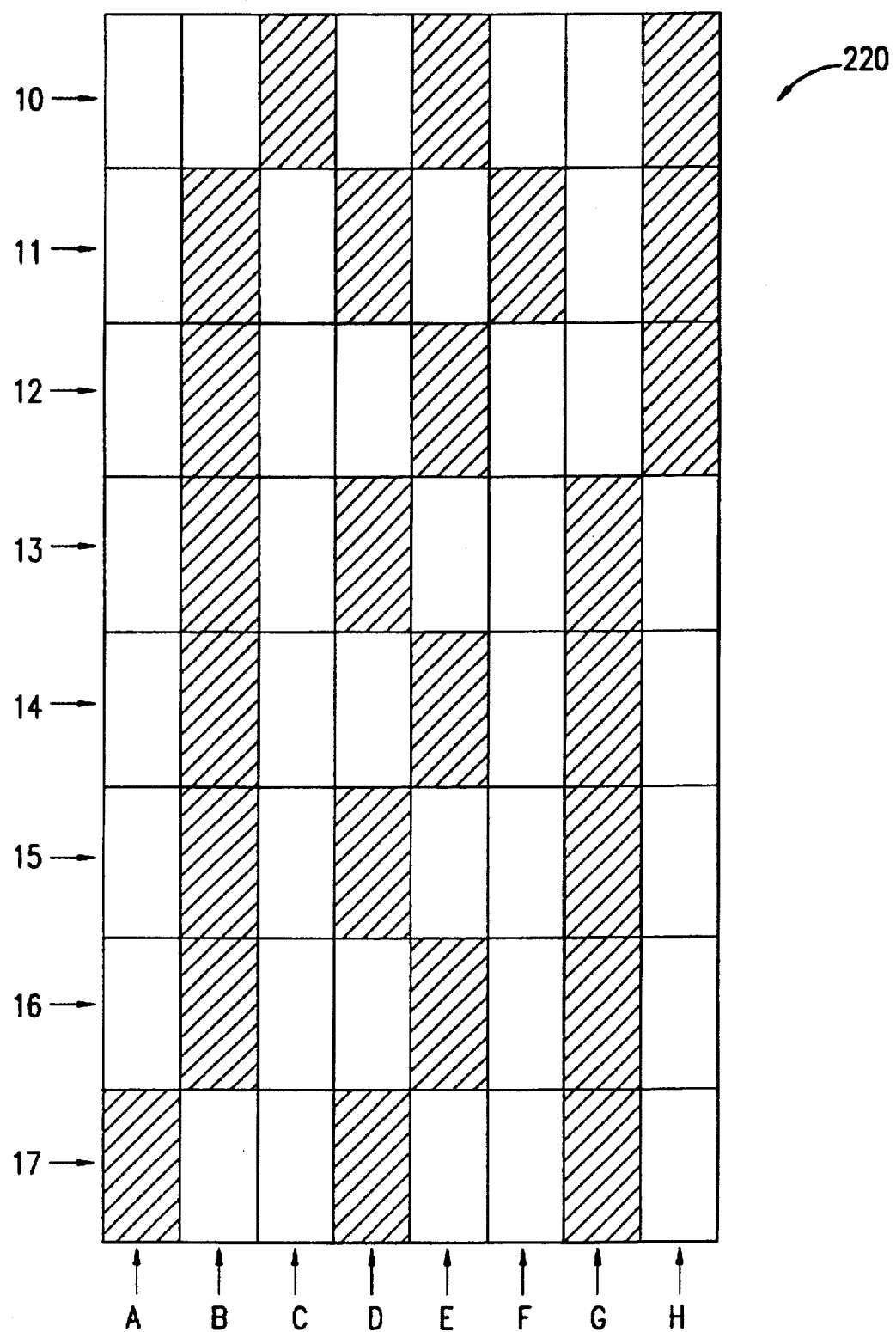
FIG. 6 is an altered pixel image according to an embodiment of the present invention.

FIG. 5 shows a flowchart describing an embodiment of the present invention that will be described with respect to FIGS. 6 and 7 for a single pixel row. However, as will be described below, it is understood that operation may occur for an entire swath of pixel data whereby several pixels (normally the height of the printhead) will be simultaneously considered in parallel.

Figure 1:
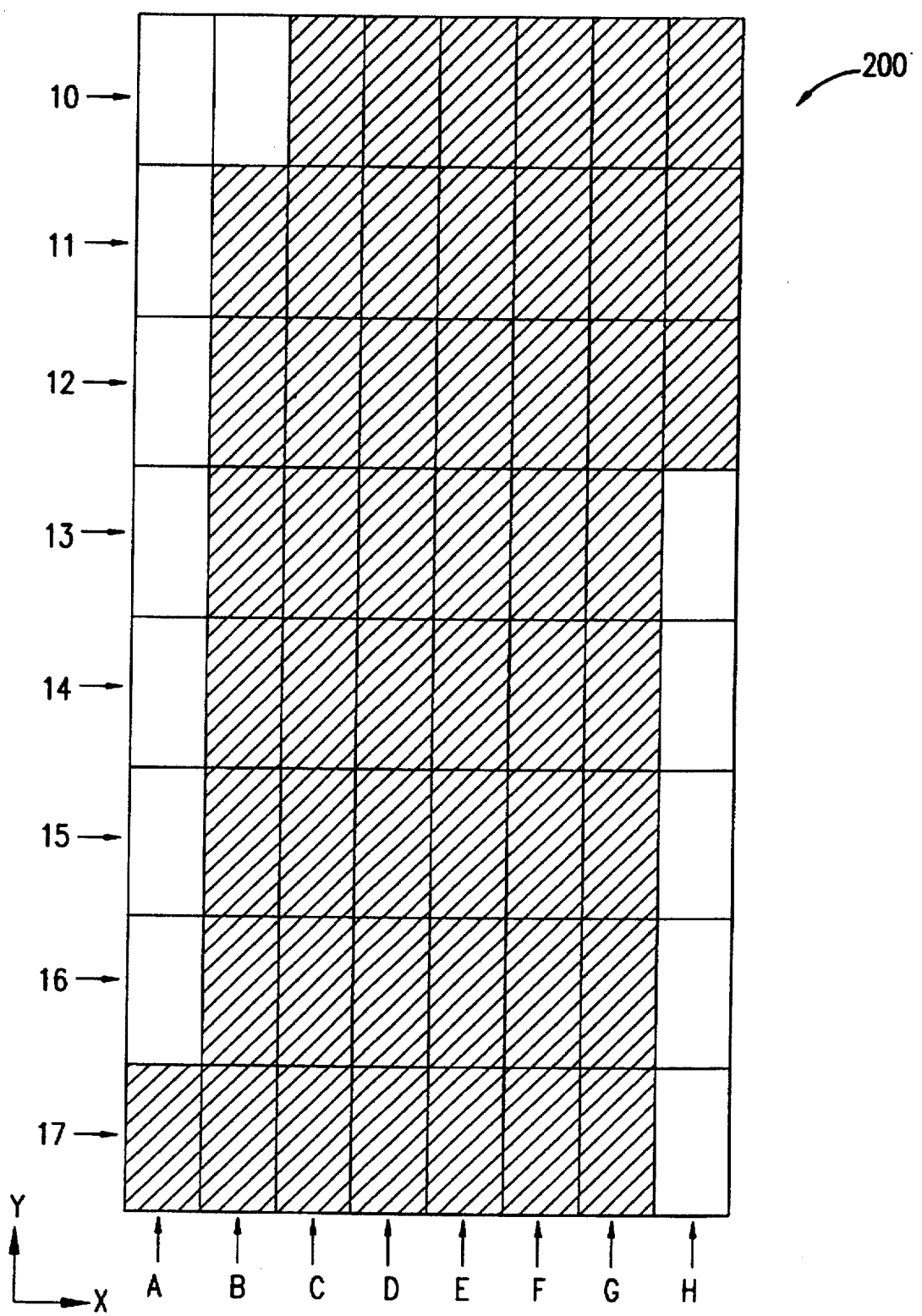
FIG. 1 is a pixel image desired to be printed.
Figure 2:
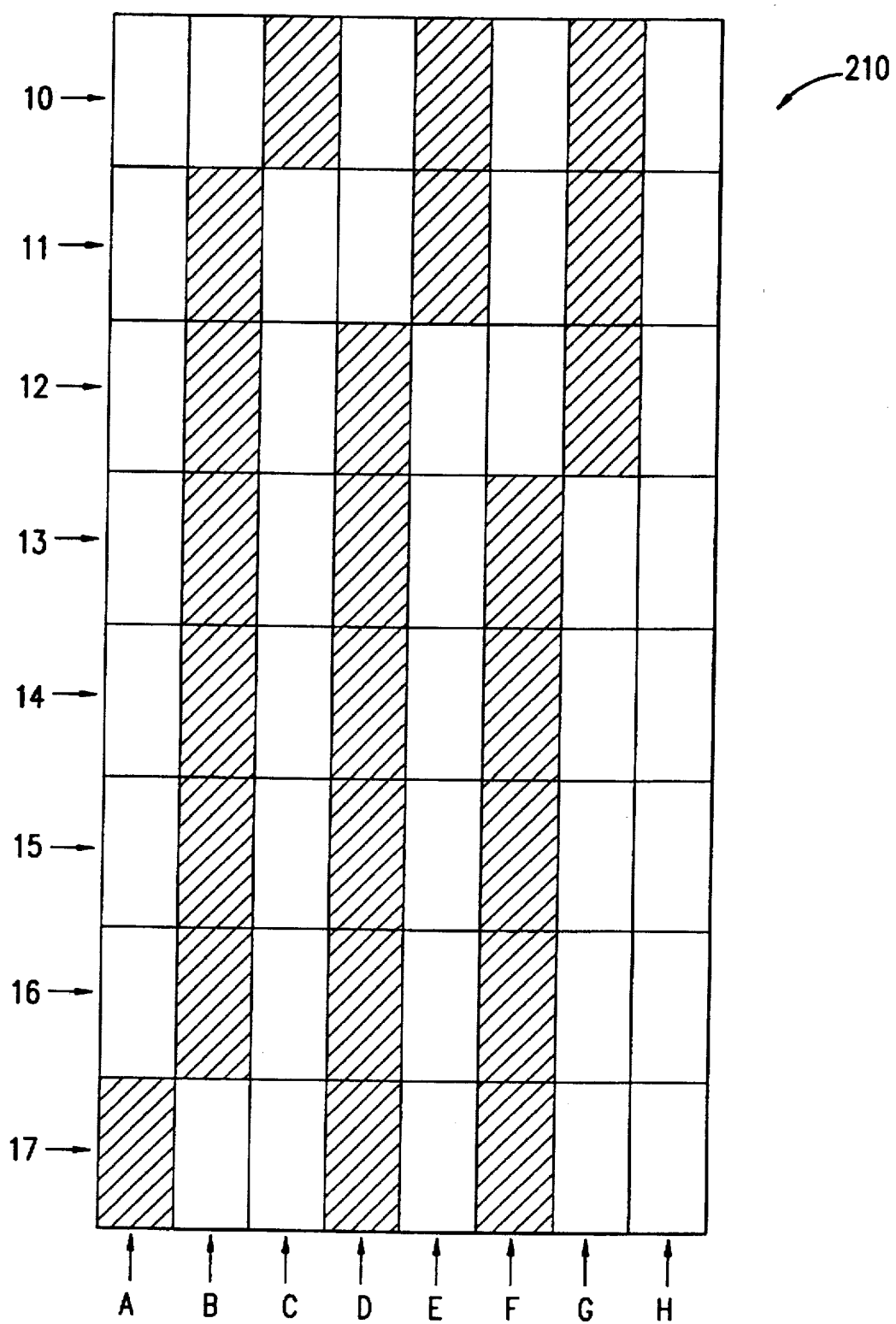
FIG. 2 is an altered pixel image according to a method described in U.S. Pat. No. 5,270,728.

Initially, a pixel image 200 is received in the controller 50 in step 100. The image may be created from a scanning device, a ROS, a computer or other similar devices. For illustration purposes, the image that is received is the original pixel image 200 shown in FIG. 1. In step 102, a parity indicator N is set to one at the start of an even numbered row as the pixel row is being examined in a left-to-right manner on an even row, and set to zero at the start of an odd numbered row. For example, when examining the original pixel image 200 from FIG. 1, the parity indicator N will be set to one upon the controller 50 examining pixel 10A, but zero on examining pixel 11A. While this embodiment will be described with respect to step 102 as including a parity indicator, it will be appreciated that this step may inherently be a part of other steps such as, for example, step 112. In step 103, the state of the current pixel is tested. If it is ON, operation continues to step 104, otherwise operation continues to step 120.

In step 104, a determination is made whether the current pixel being examined is a left edge pixel (i.e., whether the previous pixel was OFF in the input and the current pixel is ON). If so, the current pixel is maintained ON in step 114. For example, FIG. 6 shows pixel 10C being maintained ON. Operation continues to step 120 where the parity indicator N is toggled (by subtracting it from one). The next pixel to be considered is pixel 10D. In step 104, it is determined that the current pixel 10D is not a left edge pixel and operation proceeds to step 106. Because pixel 10D is the second pixel from the left edge pixel (i.e., the previous pixel was a left edge pixel), the current pixel 10D is turned OFF in step 116. Again, the parity indicator N is toggled in step 120 and the next pixel is 10E. Decision steps 103, 104 and 106 are subsequently repeated. In steps 108 and 110 it is determined that the current pixel 10E is not the right edge pixel or the pixel before the right edge pixel of the row. Operation continues to step 112. In step 112, a pixel is maintained ON if the parity indicator is one, or equivalent, whether the pixel location is one of the black squares of an underlying checkerboard pattern or mask. Otherwise, the current pixel 10E is turned off.

Figure 8:
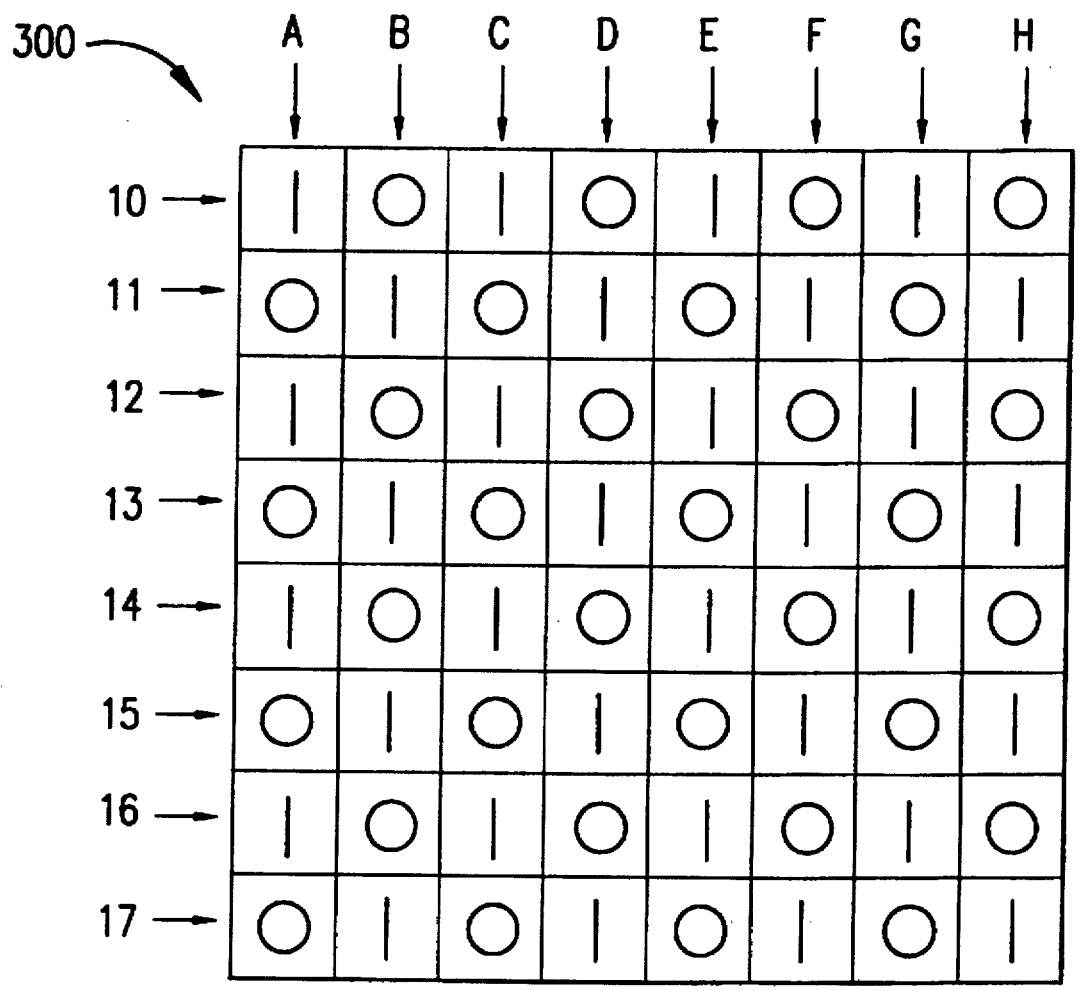
FIG. 8 shows how the address parity may be checked for a swath of pixel data.

The parity indicator follows a checkerboard pattern (or mask) 300 such as that shown in FIG. 8. The checkerboard pattern 300 shown in FIG. 8 may be stored in either software or may be performed by hardware logic. FIG. 8 shows a checkerboard pattern 300 eight rows high and eight pixels wide. This illustrates part of the grid area that the pixel image 200 may be formed within. It is understood that this checkerboard pattern 300 is in no way limited to the size described above. In one embodiment, the pixel 10E is compared in step 112 with the state of the respective position 10E on the checkerboard pattern 300 showing a logical one. By performing an AND operation between the parity indicator at the pixel 10E (a logical one) and the ON state of pixel 10E (a logical one) it is determined that the interior pixel 10E matches the parity indicator. Accordingly, the current pixel 10E is maintained ON in step 112. Other methods exist in software. For example, in software a byte at a time of the interior portion of the image can be logically ANDed with the hexadecimal value 0×55 or 0×AA for odd and even rows, respectively.

The parity indicator N is again toggled in step 120, and the next pixel to examine is 10F. Operation continues through steps 103, 104, 106, 108, 110 and arrives at step 112 where again the parity indicator is ANDed with the state of pixel 10F. Interior pixel 10F (having an ON state in the original pixel image 200) is compared with the parity indicator with the state shown in FIG. 8 (a logical zero). By performing an AND operation between the ON state and the parity indicator, it is determined that pixel 10F will be turned OFF in the altered image 220 of FIG. 6.

Again, the parity indicator N is toggled in step 120 and proceeds through steps 103, 104 and 106. In step 108, pixel 10G is determined to be the second last pixel in row 10. Accordingly, pixel 106 is turned OFF in step 116. Finally, the parity indicator N is toggled in step 120, and the controller proceeds to examine pixel 10H and repeats steps 103, 104, 106 and 108. In step 110, pixel 10H is determined to be the right edge pixel. This pixel is maintained ON in step 118. Operation continues for the subsequent pixel rows in a similar manner. However, as explained above, operation may occur for a plurality of rows simultaneously (i.e., in parallel).

The embodiment described above with respect to FIG. 5 maintains the left edge pixel and the right edge pixel ON for each respective contiguous row of ON pixels. Furthermore, the second pixel from the left edge and the second last pixel in a row are turned OFF. The remaining interior pixels within the original pixel image 200 are appropriately altered using a checkerboard pattern or mask.

Figure 7:
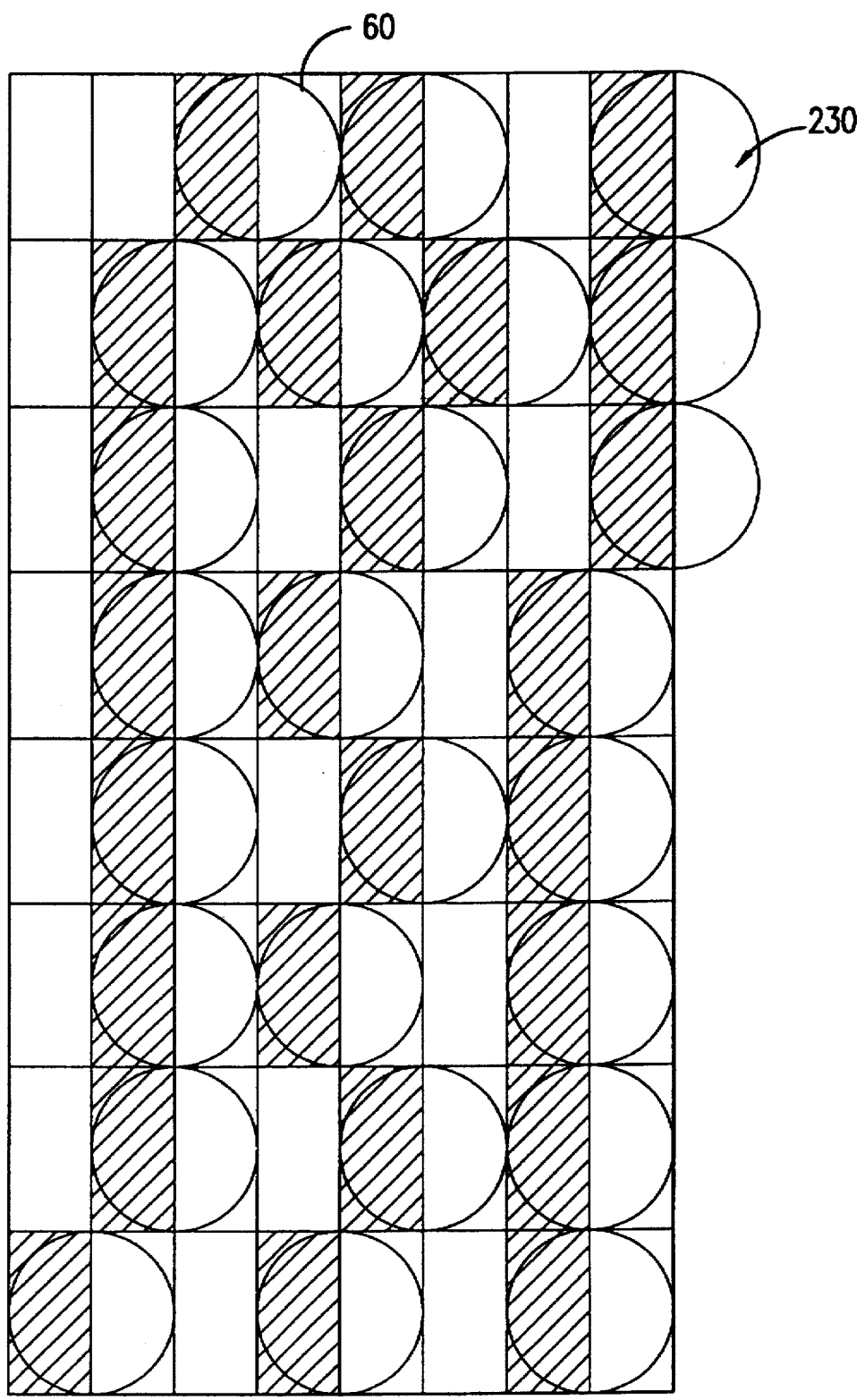
FIG. 7 is an embodiment of mapped pixels corresponding to ink drops.

FIG. 7 shows each remaining ON pixel in the altered pixel image 220 being mapped to a dot 60 corresponding to a 300 dpi ink droplet so as to form a mapped image 230. For example, each ON pixel in the altered image 220 is mapped with an OFF pixel to its immediate right. The altered pixel image 220 within the controller 50 is raster scanned by the printhead 22 to produce the dots 60 on the receiving medium 28 so as to visibly reproduce the pixel image 200 at the printhead's resolution. The mapping can result in "enlarging" the image as the last dots in each of the rows extend beyond the ends of the pixel rows of the original pixel image 200.

Figure 3:
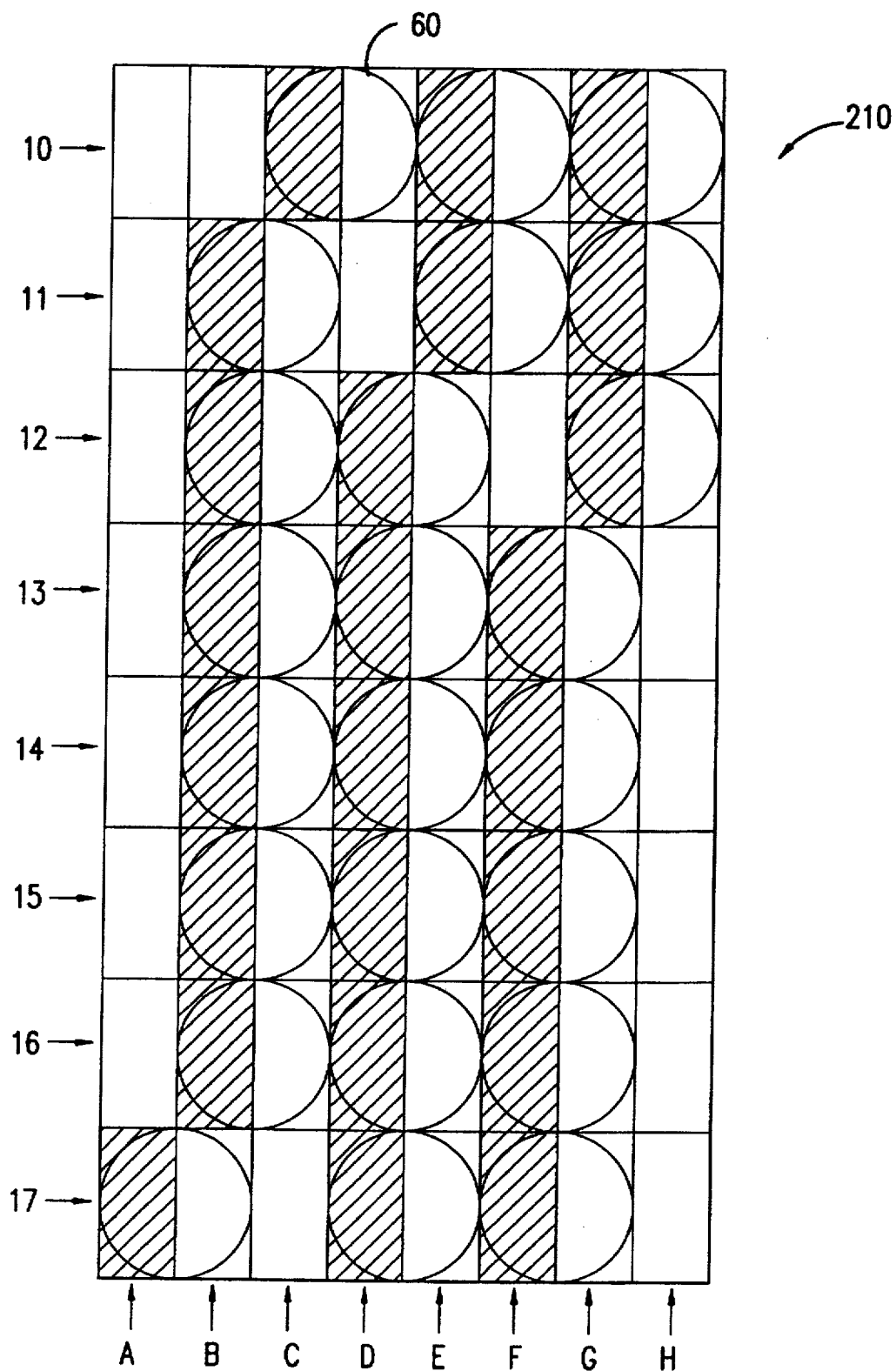
FIG. 3 is a mapped dot structure according to a method described in U.S. Pat. No. 5,270,728.

Accordingly, the above-described method does not require as complicated an algorithm as that described in U.S. Pat. No. 5,270,728. Furthermore, the present invention avoids problems of the prior art caused by similarly altered different rows such as rows 13-16 of FIG. 3 that may subsequently result in visual textural problems. Furthermore, the algorithm of U.S. Pat. No. 5,270,728 is very sensitive to both the left and right hand edges and accordingly requires proximity to be a major criteria for determining whether pixels should be maintained ON or turned OFF. However, the present invention uses a checkerboard pattern or mask such as that of FIG. 8 to easily turn pixels OFF or maintain pixels ON within the interior regions of the pixel image 200.

The above described method is preferably performed in the controller 50 using software on a computer where the bits of each scan line (i.e., pixel row) are considered serially. That is, each row is examined in a left-to-right manner. While the invention may be in practice in software as described above, it may also be incorporated into hardware logic.

An ink jet printer with a reciprocating printhead 22 normally has some number (typically 48 or more) of jets or channels that are configured in an orientation perpendicular to the direction of travel of the printhead 22. All of these jets or channels can fire essentially simultaneously to produce a vertical column of pixels at each location. In this way, as the printhead 22 traverses the width of the receiving medium 28, an entire swath of pixels is printed. Each swath is a set of pixels the width of the receiving medium 28 and the height of the printhead 22. Because firing of the jets or channels must be precisely timed, a dedicated memory buffer (also referred to as a swath buffer) is used within the controller 50 to store the image data for an entire swath prior to the traverse of the printhead 22 across the receiving medium 28. The invention may operate on the data in the swath buffer prior to its transmission to the printhead 22.

Hardware logic may be provided to always maintain the left edge pixel in a contiguous row of ON pixels in an ON state and turn OFF the second pixel for each such row. Additionally, the second last pixel is turned OFF while the last pixel of each row is maintained ON. This can be accomplished by looking forward to the next pixel to see of the next pixel is OFF in the original pixel image 200 (i.e., then the current pixel is a right edge pixel). To obtain the checkerboard pattern or mask shown in FIG. 8, a counter (or flip-flop) may be provided for each of the respective rows to alternate between logic 1's and logic 0's. For example, as the printhead 22 traverses across the receiving medium 28, the pixel rows 10, 12, 14 and 16 will alternatively switch between 1's and 0's starting with a logic 1. The pixel rows 11, 13, 15 and 17 will alternate between 0's and 1's starting with a logic 0. Therefore, whenever a consecutive block of ON pixels is encountered, the first pixel will be maintained ON, the second pixel will be turned OFF, and any subsequent pixels within the pixel row (other than the last two pixels) will follow the respective counter state as determined by the position of the printhead. This will therefore produce the checkerboard pattern within the interior region of the original pixel image 200.

While the invention has been described in relation to preferred embodiments, many modifications and variations are apparent from the description of the invention. All such modifications and variations are intended to be within the scope of the present invention as defined in the appended claims.

What is claimed is:

1. A method of printing an image with at least an ink jet printer, the image having a defined resolution along a given axis, the ink jet printer having a resolution less than the defined resolution of the image, the image comprising a plurality of pixel rows each extending from a respective first edge pixel to a respective second edge pixel, the method comprising the steps of:

maintaining the first edge pixel as an ON pixel and the second edge pixel as an ON pixel;

turning OFF selected interior pixels within the image based on a checkerboard pattern; and raster scanning remaining pixels of the image with the ink jet printer to visibly reproduce the image at the defined resolution.

2. A method of printing an image with at least an ink jet printer, the image having a defined resolution along a given axis, the ink jet printer having a resolution along the given axis less than the defined resolution of the image, the image comprising a plurality of pixel rows each extending from a respective first edge pixel to a respective second edge pixel, the method comprising the steps of:

receiving the image having the defined resolution along the given axis;

maintaining said first edge pixel as an ON pixel and said second edge pixel as an ON pixel;

for each pixel row, turning OFF each pixel corresponding to a second pixel of said each pixel row and a second to last pixel of said each pixel row, the second to last pixel being a pixel within the image just prior to said second edge pixel for any given row;

altering interior pixels of the image between the deleted pixels of said each row based on a checkerboard pattern; and after the altering step, raster scanning remaining pixels of the image with the ink jet printer to visibly reproduce the image at the defined resolution.

3. The method of claim 2, wherein the checkerboard pattern is stored in a memory of a controller, the altering step being performed in the controller.

4. The method of claim 2, wherein the altering step uses hardware logic to simulate the checkerboard pattern.

5. The method of claim 2, wherein the defined resolution along the given axis is approximately 600 dots per inch and the resolution of the ink jet printer along the given axis is approximately 300 dots per inch.

6. The method of claim 2, wherein the altering step results in each row having no adjacent ON pixels within the image.

7. The method of claim 2, wherein the altering step results in each row having no interior ON pixels within the image vertically adjacent to interior ON pixels within the image of an adjacent pixel row.

8. The method of claim 2, wherein the altering step occurs substantially simultaneously for said plurality of pixel rows.

9. A method of printing an image with at least an ink jet printer, the image having a defined resolution along a given axis, the image having a resolution along the given axis less than the defined resolution of the image, the image comprising a plurality of pixel rows each extending along the given axis from a first edge pixel to a second edge pixel, interior pixels being pixels between the first edge pixel and the second edge pixel of each pixel row, the method comprising the steps of:

receiving the image having the defined resolution along the given axis;

maintaining the first edge pixel as an ON pixel and the second edge pixel as an ON pixel;

turning OFF selected interior pixels within the image based on a checkerboard pattern to form an altered interior image; and firing ink drops from the ink jet printer at areas corresponding to remaining ON pixels of said altered interior image and the first edge pixel and the second edge pixel, the fired ink drops visibly reproducing the image at the defined resolution along the given axis.

10. The method of claim 9, wherein the altered interior image has an absence of consecutive ON interior pixels for any pixel row and an absence of adjacent ON interior pixels between adjacent pixel rows.

11. The method of claim 9, wherein the defined resolution along the given axis is approximately 600 dots per inch and the resolution of the ink jet printer along the given axis is approximately 300 dots per inch.

12. The method of claim 9, wherein the receiving step comprises receiving the image in a memory.

13. The method of claim 12, wherein the turning OFF step is performed in the memory.

14. The method of claim 9, further comprising the step of, for each row, turning OFF pixels adjacent to said first edge pixel and said second edge pixel.

15. The method of claim 9, further comprising the step of maintaining ON the first edge pixel and the second edge pixel for each pixel row.

16. An ink jet printing method for printing with at least an ink jet printer, the ink jet printer having a resolution along a raster scanning direction, the method comprising the steps of:

receiving a pixel image having a defined resolution in the raster scanning direction greater than the resolution of the ink jet printer, the pixel image comprising a first pixel row extending in the raster scanning direction from a first edge pixel to a second edge pixel and a second pixel row extending in the raster scanning direction from a third edge pixel to a fourth edge pixel;

altering the first pixel row by maintaining ON selected pixels and turning OFF selected pixels of the first pixel row, the altered first pixel row having the first edge pixel and the second edge pixel being maintained as ON selected pixels;

altering the second pixel row by maintaining ON selected pixel and turning OFF selected pixels of the second pixel row, the altered second pixel row having no adjacent ON interior pixels, the third edge pixel and the fourth edge pixel being maintained as ON selected pixels, the altered second pixel row having no ON interior pixels vertically adjacent to ON interior pixels of the first pixel row; and raster scanning the altered first pixel row and the altered second pixel row with the ink jet printer to visibly reproduce the image at the defined resolution.

17. The method of claim 16, wherein the first pixel row and second pixel row altering steps are performed using a checkerboard pattern.

18. The method of claim 16, further comprising the step of altering subsequent pixel rows by maintaining ON the edge pixels as ON pixels, by maintaining ON selected interior pixels and by turning OFF selected interior pixels of the subsequent pixel rows.

19. The method of claim 18, wherein the ON selected interior pixels are maintained ON based on a checkerboard pattern and the OFF selected interior pixels are turned OFF based on the checkerboard pattern.

20. The method of claim 18, wherein each altered subsequent pixel row has no adjacent ON interior pixels and no ON interior pixels vertically adjacent to ON interior pixels of an adjacent pixel row.

21. The method of claim 16, wherein the altering step includes the step of selectively examining each pixel in the first pixel row, starting with the first edge pixel to label each pixel as one of an ON pixel and an OFF pixel, the first edge pixel and the second edge pixel being labeled as ON pixels.

22. The method of claim 16, wherein the altering step includes the step of selectively examining each pixel in the second pixel row, starting with the third edge pixel to label each pixel as one of an ON pixel and an OFF pixel, the third edge pixel and the fourth edge pixel being labeled as ON pixels.

* * * * *